United States Patent Office 3,155,569
Patented Nov. 3, 1964

---

3,155,569
DICHLOROTOLUENE NEMATOCIDE
Adolph J. Deinet, Woodcliff Lake, N.J., assignor, by mesne assignments, to Heyden Newport Chemical Corporation, a corporation of Delaware
No Drawing. Filed July 10, 1961, Ser. No. 122,637
2 Claims. (Cl. 167—30)

The present invention relates to a method of combating parasitic worm life in agricultural soils and to compositions useful for this purpose containing dichlorotoluene.

Nematodes in the soil can and often do cause considerable damage to the crops planted in the soil. One procedure for reducing such damage is to omit planting for one or more years in an area containing infested soil. This procedure is economically unsatisfactory. In more recent years nematocides have been applied to the soil. For example, gaseous or highly volatile nematocides have been applied to the soil as disinfectants. This procedure is costly and there is little, if any, nematocidal effect over a prolonged period so that the soil is readily reinfected. Many compounds and compositions heretofore considered for combating nematodes exhibit herbicidal activity and damages plants, either at the dosages required as effective nematocides or at dosages not sufficiently larger, so that it is unsafe to use them.

It has been discovered that dichlorotoluene is an effective material for combating parasitic worm life in soil. The dichlorotoluene may be a mixture of isomers containing any two or more of the six isomers of dichlorotoluene or may consist of any one of the isomers; 2,3-dichlorotoluene, 2,4-dichlorotoluene, 2,5-dichlorotoluene, 2,6-dichlorotoluene, 3,4-dichlorotoluene, or 3,5-dichlorotoluene. A mixture of isomers is normally produced by the more economical commercial methods and is preferred from the standpoint of cost; however, a single isomer or any combination of isomers of dichlorotoluene may be used as the individual isomers are about equally effective as nematocides. As used hereinafter, the term "dichlorotoluene" includes any single isomer or any combination of isomers unless stated differently.

The dichlorotoluene may be added to the soil as such; however, it customarily will be diluted with a carrier. In normal usage the dichlorotoluene will be applied to soil in solution, as a dispersion, such as a dispersion or emulsion in water, or in a solid formulation wherein the dichlorotoluene is distributed over a dry, preferably finely-divided material, such as clay, talc, chalk, fuller's earth, or other inert material. If desired, other active substances may be included with the dichlorotoluene; for example, insecticides, fungicides, other nematocides or selective herbicides.

The dichlorotoluene also may be mixed with a commercial fertilizer for the plant growth so that one application will reduce the nematode infestation and enrich the soil. The formulation may include a wetting or emulsifying agent or other dispersant which aid the uniformity of the composition or its distribution.

In use the dichlorotoluene, either diluted or undiluted, may be applied to or mixed with the soil in any suitable manner, either prior to, during or after planting, or when the area contains established plant growth. The rate of application, dosage per unit of area, may be varied over a wide range; for example, in the range of 5 to 150 pounds of dichlorotoluene per acre. Smaller dosages may be used, particularly if application is repeated, and larger dosages may be used, particularly if the cost is warranted. For most applications the dichlorotoluene will be applied at the rate of 10–100 pounds per acre. The optimum dosage will vary to a certain extent upon the existing conditions; however, the dosage will be effective to inhibit or destroy the infestation.

Any suitable equipment may be used to apply the diluted or undiluted dichlorotoluene. The composition as applied usually will contain a minor amount of dichlorotoluene and 50 to 98% of other material to facilitate application and avoid the application of undesirably excessive amounts of dichlorotoluene as a result of carelessness or malfunction of the apparatus used.

The following examples are illustrative, it being understood that the present invention is not limited to the conditions or proportions in the examples except as set forth in the claims.

EXAMPLE I

In a laboratory test, dichlorotoluene mixed isomers were dissolved in a small amount of acetone and then dispersed in water to provide a series of aqueous dispersions at the dilute concentrations hereinafter set forth. These dilute compositions were applied to nematodes of the group, Pratylenchus sp., in test tubes and the percentage killed noted after 24 hours. For comparative purposes, similar serial dilution tests were run with a known nematocide which was a mixture of chlorinated aliphatic hydrocarbons containing 3 carbon atoms and essentially consisting of 1,3-dichloropropene and 1,2-dichloropropane, the active ingredients. This known nematocide is available commercially from Shell Chemical Company, a division of Shell Oil Company, as "D–D"®. The results are set forth in Table I.

Table I

| Concentration, percent by weight | Dichlorotoluene, percent mortality—24 hr. | Comparative Nematocide, percent mortality—24 hr. |
|---|---|---|
| 0.1 | 100 | 100 |
| 0.01 | 100 | 100 |
| 0.001 | 50 | 50 |
| 0.0001 | 25 | 25 |

The dichlorotoluene used in this example was a mixture of isomers containing 47% 2,5-dichlorotoluene, 43% total of 2,4-dichlorotoluene plus 2,6-dichlorotoluene, and 10% total of 2,3-dichlorotoluene plus 3,4-dichlorotoluene. It is to be noted the dichlorotoluene was highly effective and was as effective as the commercial nematocide used for comparative purposes.

EXAMPLE II

Dichlorotoluene was tested in the green house. The dichlorotoluene was dissolved in a small amount of acetone at various concentrations and 2 ml. portions were thoroughly mixed with 2 grams of vermiculite and dried. Each portion of treated vermiculite granules was mixed with 1500 cc. of soil infested with root-knot nematode and the soil was placed in a pot and planted with a tomato seedling. The concentrations of dichlorotoluene were such that 0.2 ml., 0.1 ml. and 0.05 ml. of dichlorotoluene was mixed with separate 2 gram portions of vermiculite, corresponding to calculated dosages in the pot of 200 lbs., 100 lbs., and 50 lbs. per acre. For comparative purposes pots of infested soil were prepared containing no additive (blank). Pots of infested soil also were prepared in the same manner as those containing the dichlorotoluene except acetone only was used. There were two replicates of each.

After two months, the plants were depotted and the amount of infected roots observed. The results are set forth in Table II in which the following values are used.

1 indicates no roots infected
2 indicates 1–25% roots infected
3 indicates 26–50% roots infected
4 indicates 51–75% roots infected
5 indicates 76–100% roots infected

Table II

| Treatment | Root Index Replicates | |
|---|---|---|
| | A | B |
| Blank | 5 | 5. |
| Acetone | 5 | 5. |
| Dichlorotoluene: | | |
| 200 lbs./acre | Phytotoxic | Phytotoxic. |
| 100 lbs./acre | 1 | 2 (only one knot per root). |
| 50 lbs./acre | 2 | 2. |

The pots treated with dichlorotoluene were rated as indicated since root knots were present; however, the knots were close to the top of the root system. This is a common occurrence encountered with known efficient nematocides and may be caused by a low concentration of nematocide at ground level. The dichlorotoluene was an efficient nematocide.

The largest dosage of dichlorotoluene was phytotoxic, as indicated. The tomato plant is, however, known to be unusual in that it is highly sensitive and is readily affected by added chemical compounds. The fact that the tomato plant was affected at this dosage does not mean that this large dosage could not be used with other plants.

The dichlorotoluene was a mixture of all isomers in the following proportions:

| | Percent |
|---|---|
| 2,5-isomer | 33 |
| 2,4-isomer+2,6-isomer | 37 |
| 2,3-isomer+3,4-isomer | 27 |
| Monochlorotoluene | 1 |
| Total | 98 |

EXAMPLE III

Serial dilution tests were carried out in the laboratory in the same manner and at the same concentrations as described in Example I, using the following substantially pure isomers of dichlorotoluene:

2,4-dichlorotoluene
3,4-dichlorotoluene
2,5-dichlorotoluene
2,6-dichlorotoluene

Two series of tests were carried out using Pangrellus sp. and three series of tests were carried out using Pratylenchus sp. The isomers were about equal in activity and all were effective nematocides.

Dichlorotoluene including all of its isomers are known chemical compounds and for present purposes may be produced in any known manner. The various isomers as well as the mixtures of isomers of dichlorotoluene are water insoluble and boil around 200° C. Thus, the rate of loss by leaching or evaporation from the soil is very low so that dichlorotoluene is an effective nematocide in the soil over a prolonged period.

I claim:

1. The method of combating parasitic worm life which comprises contacting such worm life with a toxic amount of dichlorotoluene having the two chlorine atoms on the benzene ring.

2. The method of combating nematodes which comprises contacting the nematodes with a toxic amount of dichlorotoluene having the two chlorine atoms on the benzene ring.

References Cited in the file of this patent

UNITED STATES PATENTS

| 2,935,393 | Luckenbaugh | May 3, 1960 |
| 2,977,211 | Godfrey | Mar. 28, 1961 |

FOREIGN PATENTS

| 83,819 | Holland | Jan. 15, 1957 |

OTHER REFERENCES

Chemical Abstracts, "Nematocide," vol. 52, 1958, page 1541(f).